United States Patent [19]
Bergles et al.

[11] 3,823,825
[45] July 16, 1974

[54] WATER TREATMENT FILTER BED FOR SEWAGE SYSTEMS

[76] Inventors: Joseph L. Bergles, Rt. 2, Box 385-3901 3 Mile Rd., Franksville, Wis. 53132; Marvin A. Nelson, Rt. 1, Box 169, Union Grove, Wis. 53182

[22] Filed: June 15, 1973

[21] Appl. No.: 370,218

[52] U.S. Cl............................ 210/170, 61/11, 61/13, 210/284, 210/532 S
[51] Int. Cl...................... E02b 11/00, B01d 23/16
[58] Field of Search.......................... 61/10–13, 35; 210/2, 16, 170, 532 S, 284

[56] References Cited
UNITED STATES PATENTS

| | | | |
|---|---|---|---|
| 848,279 | 3/1907 | Ashley | 210/170 X |
| 956,665 | 5/1910 | Ashley | 210/170 X |
| 1,760,314 | 5/1930 | Murrey | 61/11 |
| 3,680,704 | 8/1972 | Schaefer | 210/170 X |

*Primary Examiner*—Charles N. Hart
*Assistant Examiner*—Robert H. Spitzer
*Attorney, Agent, or Firm*—James E. Nilles

[57] ABSTRACT

A trickle-type water treatment filter bed formed in the ground for receiving water of a sewage plant and which absorption bed has a drain wall around its sides and which functions to prevent saturation of the absorption bed. The drain wall means for the absorption bed finds particular utility in soils of poor permeability. The drain walls have tile means located at a depth lower than the tile means in the absorption bed and the drain walls function to prevent surface water from running into the absorption bed thereby contributing to its saturation, and also functions to drain off excessive water in the absorption bed so as to permit the absorption bed to function in a proper manner.

5 Claims, 2 Drawing Figures

WATER TREATMENT FILTER BED FOR SEWAGE SYSTEMS

BACKGROUND OF THE INVENTION

The invention pertains to a trickle type sewage water treatment filter bed of the type which is substantially filled with gravel and in which gravel drain tile is located for conducting the water through the gravel bed.

The filter bed arrangement provided by the present invention finds utility when used with a sewage treatment plant of the type shown in our U.S. Pat. No. 3,681,236 issued Aug. 1, 1972 and entitled "Sewage Treatment Plant and Method of Treating Sewage." More specifically, the invention pertains to the trickle type water filter bed shown in that patent.

When such filter beds are used in soil having poor permeability characteristics, the absorption bed often becomes saturated to a point where it cannot properly perform its function. This saturation, due to excessive water, is caused for example, by the run-off of surface water from the surrounding area and into the absorption bed which thus overloads the bed. Saturation of such bed also occurs, particularly at their lower end, due to the fact that the bed cannot dispose of sewer water and treated sewage water therein at a sufficiently fast rate, and consequently, the absorption bed becomes soggy and wet with water running out of the bed and before it has properly been filtered through the gravel.

SUMMARY OF THE INVENTION

The present invention provides a trickle type water treatment filter bed arrangement having an absorption bed formed in the ground in which gravel is placed. Tile means extends throughout the bed for conducting water from the sewage treatment plant and throughout the length of the bed. The invention includes a drain wall located in the ground and spaced a short distance from the absorption bed and this drain wall is formed at a depth lower than the depth of the absorption bed. The drain wall contains drain tile means located in the gravel and at a location lower than the tile means in the absorption bed. If conditions demand it, the drain wall may extend along three sides of the absorption bed, for example, it may extend along three sides of the absorption bed, it generally not being necessary to provide such a drain wall at the entry end of the absorption bed, that is that end which is usually of higher elevation.

The drain wall provided by the present invention prevents surface and ground water from running into the absorption bed and thereby overload the latter and it also functions to drain excessive sewer water from the absorption bed itself, that is to say, such sewer water is filtered through the ground which separates the absorption bed from the drain wall, thereby removing excessive water from the absorption bed and permitting the absorption bed to function in its proper filtering manner.

These and other objects and advantages of the present invention will appear hereinafter as this disclosure progresses, reference being had to the accompanying drawings.

DESCRIPTION OF A PREFERRED EMBODIMENT

Figure 1:
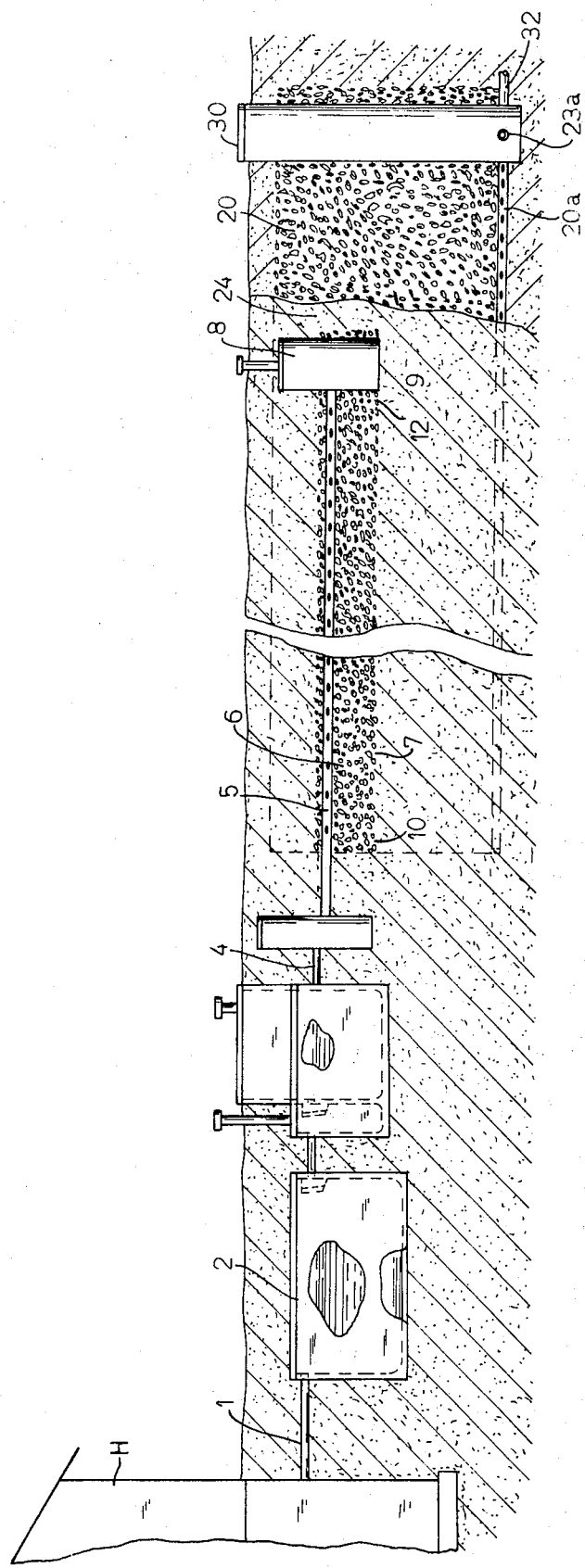
FIG. 1 is a side elevational view, in section and with certain areas broken away for clarity, of a sewage treatment plant and including a filter bed of the type contemplated by the present invention.
Figure 2:
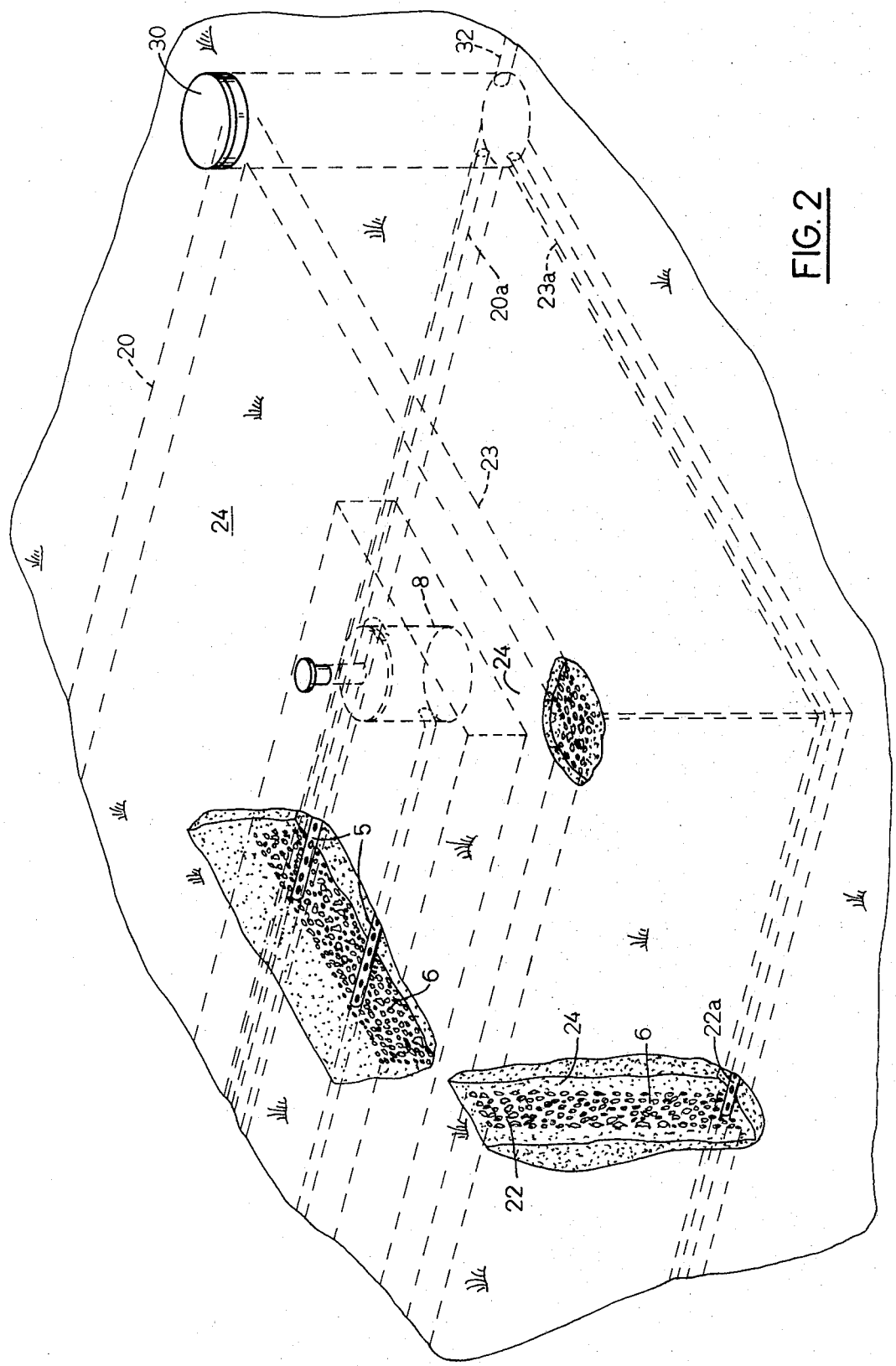
FIG. 2 is a schematic perspective view, with areas broken away for clarity, of the filter bed arrangement shown in FIG. 1.

The sewage treatment plant shown in FIG. 1 includes a pipe 1 through which the raw sewage flows from the house H and into a first tank 2. As explained in said U.S. Pat. No. 3,681,236, after the sewage is treated in the plant, it is pumped out of the plant via pipe 4 and into tile means 5 located in a gravel bed 6 in the ground. Thus, the gravel bed 6 constitutes a conventional absorption bed and it will be noted that the bottom of the bed is at a certain level 7. The tile means 5 may consist of a series of pieces of tile laid end-to-end, for example of the plastic type and having perforations through which the water to be treated can flow through the gravel bed in the known manner. Any number of "runs" of tile may extend through the gravel bed and as shown in FIG. 2, two such runs of tile are laid generally in parallelism along the length of the bed. At the end of the absorption bed, the tile means 5 communicates with a basin 8, the bottom 9 of which is located at the same generally depth as the bottom of the gravel in the bed. The tile means in the absorption bed is pitched, that is, laid at an incline, so that the water can drain from the inlet end 10 of the bed and to the lower end 12 of the bed, such pitch can for example be in the neighborhood of a six inch drop for 100 feet of length of the bed.

In accordance with the present invention, a drain wall is provided along the side of the absorption bed and spaced therefrom. As shown, such a drain wall may be located along each of opposite sides of the absorption bed, and a third drain wall may also be located transversely along the lowermost end of the absorption bed. More specifically, a drain wall 20 is located along one longitudinal side of the absorption bed, another drain wall 22 is located along the other side of the absorption bed, and the third drain wall 23 is located across the lower end of the absorption bed and is in communication with the walls 20 and 22. It will be noted that three drain walls are located a distance spaced from the absorption bed so that an intervening barrier of ground 24 is located between the absorption bed and the drain walls. It should furthermore be noted that the bottom of the drain walls are at a lower elevation, that is, they are deeper in the ground that the bottom 12 of the absorption bed.

The drain walls 20, 22 and 23 also include tile means 20a, 22a and 23a, respectively, which may be of the same type used in the absorption bed itself and these tile means are located at a greater depth than the tile means in the absorption bed. The drain walls are furthermore substantially filled with gravel, say for example, within six inches of the surface of the ground.

The tile means in the various drain walls are all connected together at their discharge end, that is to say, they all are in fluid communication with an inspection manhole 30, the bottom of which is located at the same depth as the tile means at their discharge end. A discharge pipe 32 may then extend from the inspection manhold for discharge into the ground, the water at this point being substantially unpolluted.

The ground barrier 24 located between the absorption bed and the drain walls is preferably approximately three to five feet in width so that excessive water from the absorption bed is properly filtered before reaching the drain wall. The ground barrier acts to filter out the phosphates, for example, in the water.

The present invention finds particular utility in soil of poor permeable character. The drain walls prevent ground and surface water from the areas located around the absorption bed from flowing into the absorption bed and thus preventing it from properly draining the sewage water. In other words, the surface water is trapped by the wall drains before it has a chance to enter and saturate the absorption bed. Furthermore, the drain walls act to receive excessive water from the absorption bed which cannot filter through the absorption bed without sufficient rapidity. This sewer water from the absorption bed is filtered through the ground barrier between the absorption bed and the drain wall and enters the drain walls where it filters through the gravel therein and collects in the tile means in the drain wall for ultimate discharge to a ditch or other area in the ground, at which point the water is of sufficiently non-polluted character.

We claim:

1. A sewage water treatment filter bed arrangement comprising an absorption bed formed in the ground and filled with gravel, tile means extending in said gravel for conducting sewage water through said tile means for disposal in said gravel of said bed, a drain wall formed in the ground and spaced from said bed and being of a depth greater than said absorption bed, said drain wall being filled with gravel and having tile means located in said gravel and at a depth lower than the tile means in said absorption bed; said drain wall functioning to inhibit surface water from entering said absorption bed, lower the ground water table level, and also functions to drain excess water through the ground which separates said absorption bed from said drain wall and from said absorption bed; whereby excessive water is removed from said absorption bed and prevented from saturating said absorption bed.

2. The arrangement set forth in claim 1 further characterized in that said drain wall extends around at least three sides of said absorption bed, and said tile means in said drain wall on all three sides of said bed is located at a lower depth than the tile means in said absorption bed.

3. The arrangement set forth in claim 2 including an inspection manhole into which the tile means in said drain walls extends.

4. A sewage water filter bed arrangement comprising an elongated absorption bed formed in the ground and having gravel or the like therein, a series of drain tiles arranged end to end extending along the length of said bed and in said gravel for conducting sewage water through said tiles for disposal in said gravel of said bed for trickling therethrough, a drain wall formed in the ground and spaced from and along said bed to form a ground barrier between said absorption bed and said drain wall, said drain wall being of a depth greater than said absorption bed, said drain wall including gravel or the like therein and having a series of end to end tiles located in said gravel and at a depth lower than the tiles in said absorption bed; said drain wall functioning to inhibit surface water from flowing into said absorption bed and lowers the water table level, and also functions to drain excess sewage water through said ground barrier and from said absorption bed; whereby excessive water is removed from said absorption bed and prevented from saturating said absorption bed.

5. The arrangement set forth in claim 4 further characterized in that said drain wall extends around at least three sides of said absorption bed.

* * * * *